United States Patent [19]

Fuhrer

[11] 4,272,785
[45] Jun. 9, 1981

[54] DEFECT COMPENSATION FOR COLOR TELEVISION

[75] Inventor: Jack S. Fuhrer, Carmel, Ind.

[73] Assignee: RCA Corporation, New York, N.Y.

[21] Appl. No.: 44,364

[22] Filed: Jun. 1, 1979

[51] Int. Cl.³ .................. H04N 5/76; H04N 9/535; H04N 5/78; H04N 5/795

[52] U.S. Cl. ................................. 358/127; 358/8; 358/21 R; 360/38

[58] Field of Search .............. 358/8, 21, 127, 163, 358/128–130; 360/38

[56] References Cited

U.S. PATENT DOCUMENTS 3,949,416  4/1976  Stalley et al. ............ 360/38 X
4,122,489  10/1978  Bolger et al. ............ 360/38 X Primary Examiner—Bernard Konick
Assistant Examiner—Aristotelis M. Psitos
Attorney, Agent, or Firm—E. M. Whitacre; A. L. Limberg; E. P. Herrmann

[57] ABSTRACT

A defect compensation circuit of the type that substitutes a portion of delayed signal information for a real-time signal defect including circuitry for correcting chrominance phase reversal. The delayed signal is sampled at ½ the period of the chrominance before and after a 1H delay. The signal samples are summed and proportioned to provide a substitution signal having its chrominance signal in phase with the real time signal, and an average luminance signal exhibiting non-observable distortion.

5 Claims, 5 Drawing Figures

DEFECT COMPENSATION FOR COLOR TELEVISION

This invention relates to defect compensation. In particular, the present invention relates to a defect compensator which may be used to provide compensation for defects in the reproduction of color television signals.

Television signals derived from transmission and receiving systems or recording media such as video discs or magnetic tape frequently include defects which cause disturbances when reproduced as images at the television receiver. The disturbances appear as black and white streaks or flashes on the viewing screen. The source of the signal defects may be electrical interference with regard to transmitted signals, or in the case of recorded signals may be due to blemishes or voids in the recording medium.

Defect compensators of the prior art have operated on the principle that information present on the screen of a television receiver occurs in segments each of which comprises horizontal scan lines of information not likely to differ greatly from the preceding line. Because of the high likelihood of redundancy from line to line it is possible to compensate for a defect by substituting information from a previous line. The defect compensators of the prior art therefore, store information from a previous line and insert the stored information into the video signal when a defect occurs.

This type of compensation works well for black and white reproduction from only the luminance portion of the video signal, but produces undesirable effects when applied to the composite video signals. In these composite video signals color information is contained in a phase and amplitude modulated chrominance or chroma subcarrier which is located within the frequency band of the luminance video signal. Further, each displayed frame consists of two interlaced fields wherein the line-by-line display of one field is interdigitated with the line-by-line display of the second field. The line synchronization frequency to effect the interlace results in the chroma signal being 180° out of phase on alternate lines of the same field with respect to the sync pulse. Thus if a defect occurs and a portion of the previous line is substituted, it will appear in the wrong color.

To compensate for the color error, a delay equal to one-half the period of the chroma subcarrier was added to the line storage medium to correct the phase of the chroma signal. This, however, delays the luminance by the same amount effecting a spatial displacement of the picture detail on the screen, causing the vertical edges of images to be jagged. F. J. Hadye, et al., in their "Dropout Compensator for NTSC Color Television", U.S. Pat. No. 3,463,874 issued Aug. 26, 1969 suggested separating the chroma and luminance signals, separately delaying the luminance signal and delay and phase compensate the chroma signal, and then recombining the two signals. This procedure results in the color and spatial position of the substituted picture elements appearing correctly on the screen.

In apparatus embodying the present invention, a defect substitution signal is generated by summing and averaging two delayed composite video signals. The delayed signals are respectively delayed a prescribed period less than one line and a like prescribed period greater than one line. The summed and averaged signal provides a composite video signal with a properly phased chroma subcarrier and a luminance component delayed by precisely one line.

Figure 1:
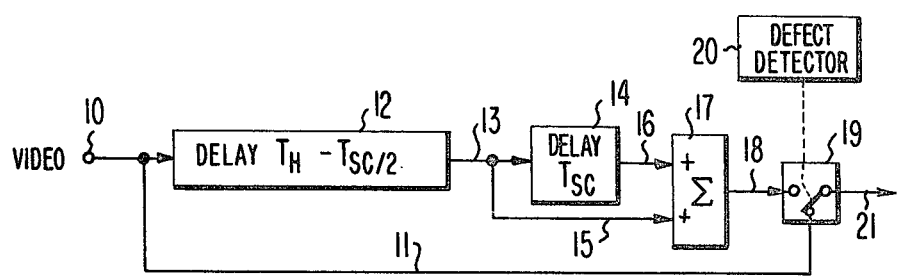
FIG. 1 is a schematic diagram (in block form) of a defect compensation circuit applicable to color television systems which includes the present invention.

Referring to FIG. 1, real-time video signal, i.e., the most recently available signal from either a recording or a transmission medium, having signal defects or dropouts is applied to input terminal 10 of the defect compensation circuit. This real-time video signal is a composite video signal comprising both luminance and chroma information. Corrected video signal is to be available at output terminal 21. Defect detection circuit 20, an example of which is described in "Defect Detection and Compensation Apparatus for Use in an FM Signal Translating System" issued to J. K. Clemens, et al. on Jan. 4, 1977, is arranged (by means not shown) to detect defects in the video signal at a point in the overall system ahead of input terminal 10 for producing control pulses correctly timed to control the switch 19. Switch 19 selectively applies real-time video signal available on connection 11 or delayed and phase-compensated video signal available on connection 18 to output terminal 21 for subsequent processing and eventual display.

Delay circuits 12 and 14 and signal averaging circuit 17 make available at connection 18 a video signal suitable for being substituted for real-time video signal whenever a defect is detected.

To facilitate description, the circuit of FIG. 1 will be explained in terms of the NTSC television system. NTSC video signals comprise a luminance signal with a bandwidth from zero Hertz to 4.5 MHertz and a chroma subcarrier at 3.58 MHertz. The period $T_H$ of one signal segment or one horizontal line of signal information is 63.5 microseconds and the period $T_{sc}$ of the chroma subcarrier is 0.28 microseconds. As an incident to the interlacing of two fields of information to create one frame of display information the chroma subcarrier on alternate lines has an exactly 180° phase difference with respect to the edge of the line synchronization pulse. It will be appreciated, however, by those skilled in the art, that the present invention has application to other video signal standards—notably the buried-chroma-subcarrier standard used in home television tape recording—and the scope of the invention is such as to encompass operation to such alternative video signal standards.

Delay element 12 receives video information from input terminal 10 and causes it to appear $T_H - \frac{1}{2}T_{sc}$ seconds later at connection 13. Delay element 14 receives the delayed signal from element 12 and delays it an additional $T_{sc}$ seconds. Signal at connection 16 is delayed a total of $T_H + T_{sc}/2$ seconds. The signals at connections 13 and 16 are respectively ahead and behind an exact one line delay period by one-half cycle of the chroma subcarrier frequency. Therefore, the chroma signals available at connections 13 and 16 are both 180° out of phase with signal delayed for the period $T_H$ and are both in phase with the chroma signal of the real-time video signal. The luminance signal available at connections 13 and 16 is also advanced and delayed respectively from exactly one-line delay. But considering the maximum luminance signal frequency to be, for practical purposes, less than 3.5M Hertz with a corresponding period of approximately 0.286 microseconds, the respective advance and delay of $T_{sc}/2$ or 0.14 microseconds is of small consequence.

Summation circuitry 17 combines the signals delayed by $T_H-T_{sc}/2$ seconds and $T_H+T_{sc}/2$ seconds to generate a signal at connection 18 proportional to their average value. Considering that the difference occurring in the signals must have occurred in finite time, especially due to system bandwidth restrictions, the average signal is the time averaged signal occurring at $T_H$. The effect is to insignificantly blur images having a vertical edge produced on the viewing screen with a deviation in color which is not detectable by the human eye.

Each of the delay elements 12 and 14 may be any one of a number of device types. For example, both may be charge transfer devices (CTD), e.g., charge coupled devices (CCDs) or bucket brigate devices (BBDs) of the serial or serial-parallel type. An alternative analog signal delay device is the surface acoustic wave (SAW) device. Where delay elements 12 and 14 are realized with charge transfer devices, they may be subsumed in a signal device having signal tapping points to produce signals with the requisite delays. This is indicated in block form in FIG. 2

CTD delay line 34 responsive to clocking signals generated by drive circuit 35 receives analog signal from connection 33 and produces that signal delayed by a first period $$(T_H - \frac{T_{sc}}{2})$$

at a first tap output connection 36, delayed by a second period $(T_H)$ at a second tap output connection 37, and delayed by a third period $$(T_H + \frac{T_{sc}}{2})$$

at serial output connection 42. The first and third delay signals are averaged by the summing amplifier circumscribed in dashed block 17.

Figure 2:
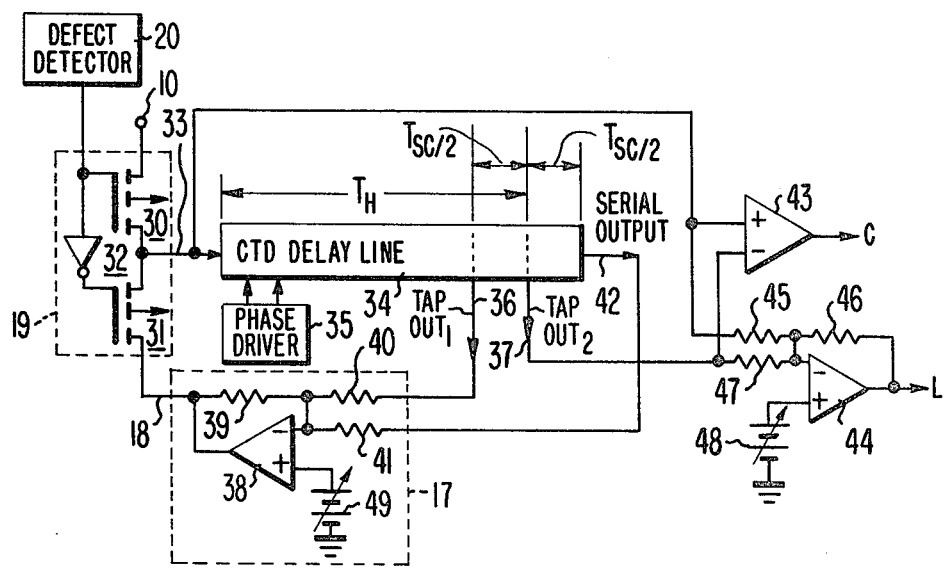
FIG. 2 is a schematic diagram (partially in block form) further specifying the FIG. 1 embodiment.

The FIG. 2 circuit differs from the FIG. 1 circuit in that defect-corrected video is directed into the delay element by the switch means circumscribed by dashed block 19. This is an instance of employing the delay element to comprise a portion of the defect compensation function and also a portion of a signal filtering function. The result is that defects in the real-time signal are substituted by corrected signal rather than merely previous signal. Tapped charge transfer devices are particularly suited for this application due to the relative ease that a desired delay can be achieved merely by selection of particular tap position. By virtue of the delay being effected by sequential clocking the signals available as differing taps are constrained to be in phase and thereby facilitating active filtering techniques and the signal averaging. Furthermore, additional taps may be added (in the design stages) at little extra cost or inconvenience. Taken together the combined filtering and substitution circuitry results in a substantial device parts saving and superior performance.

Delay line 34 is tapped to produce a signal available at connection 37, delayed by $T_H$. Differential amplifier 43 responsive to video signal delayed by $T_H$ and current video signal, differentially sums the essentially redundant luminance information and the 180° phase differing chroma information to produce a signal which is substantially chroma information, stripped of the luminance signal. Summing amplifier 44 responsive to the current and delayed video signals produces a signal which is substantially luminance information stripped of the chroma subcarrier.

Switch means 19 as shown in FIG. 2 comprises p-channel enhancement type field effect transistors 30 and 31 controlled by defect detector 20. Owing to inverting amplifier 32, transistor 31 is caused to be conducting while 30 is non-conducting and to be non-conducting while 30 is conducting. Transistor 30, when conditioned to conduct, selectively applies signal from terminal 10 to connection 33; and transistor 31, when conditioned to conduct, selectively applies corrected signal from connection 18 to connection 33.

Figure 3:
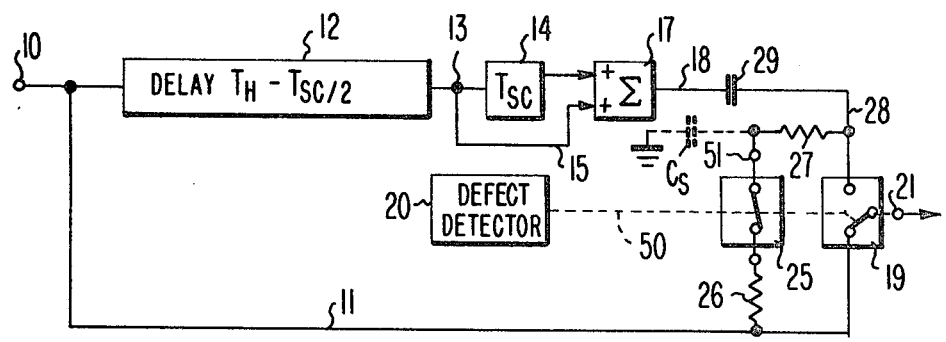
FIGS. 3 and 4 are schematic diagrams (in block form) of defect compensation circuits embodying the present invention and including means for eliminating undesirable differences in the d-c components between the delayed and current video signals.
Figure 4:
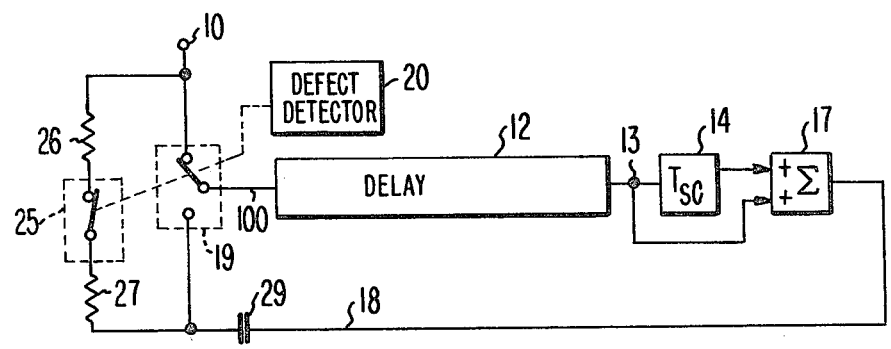
Figure 5:
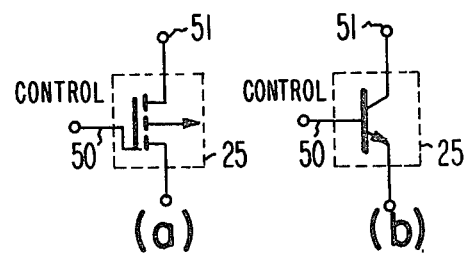
FIGS. 5a and 5b are schematics of representative, alternative transistor realizations of switch 25 of the FIG. 3 and FIG. 4 defect compensation circuit.

The FIG. 3 circuit incorporates means for insuring that differences in the d-c signal component between the delayed video signal and the current or real-time video signal are not translated to output terminal 21. Only the a-c component of the delayed signal available at connection 18 from summation circuitry 17 is applied via capacitor 29 to the switch means 19. Thus d-c level shifts in the delayed signal, resulting from either the delaying or the summation circuits, do not appear on connection 28 to be passed along to affect the compensated signal at output terminal 21.

The d-c component applied to connection 28, to provide compensated signal when the delayed signal is substituted for real-time video, is the d-c potential at connection 28 established by the charge on capacitor 29. The circuit including switch 25 and resistors 26 and 27 selectively provides a charging conduction path between capacitor 29 and real-time video connection 11. Switch 25 is closed concurrently with switch 19 to apply real-time video to output terminal 21. The difference between the d-c components of delayed and real-time video determines the direct current flowing through resistor 27 to adjust the charge stored in capacitor 29. The resistors 26 and 27 in conjunction with stray capacitor $C_S$ constitute a low-pass filter to apply only the d-c real-time component to capacitor 29 and also to prevent delayed a-c video at connection 28 from modulating the connection 11 when switch 25 is closed.

Switch 25 is open during the periods that composite video signal with line delay is applied to terminal 21 via switch 19. The d-c stored on capacitor 29 at connection 28 is nearly identical to the real-time video at the time of switching but subsequently begins to decay due to current leakage paths and the input bias requirement of the circuit first subsequent to terminal 21. A small potential decay can be tolerated as it is manifested by only a gradation of brightness along the line displayed, which is preferable to an abrupt change in brightness that would occur from an abrupt d-c shift. The discharge time constant should be relatively long with respect to the duration of the longest defect anticipated in the video signal. The value of the impedance connected at terminal 21 is determinative of the size of capacitor 29.

Defect detection circuit 20 may simultaneously control switches 25 and 19. It is often advantageous to control switch 25 by an alternate control means, however, to prevent blanking or sync pulses on the video signal from charging capacitor 29 where the charging time constant of the series circuit including switch 25 is relatively short.

While the description of this invention has been couched in terms of the NTSC system, it is not to be construed to be so limited, and the claims should be construed in this light. For example, the invention is applicable to the European standard television system.

What I claim is:

1. In a system for processing electronic analog signals occurring in prescribed time segments, the adjacent segments containing a degree of redundant information and susceptible of containing periods of detectable signal errors within said segments, error correction means comprising:

means for temporally translating prior signal segments into temporal coincidence with the temporally current or real-time signal segment, said translating means providing first and second signals respectively advanced and delayed relative to the delay of one signal segment by a prescribed period, substantially less than the period of one segment;

error detecting means responsive to errors in said real-time signal to provide control signals;

means for combining the first and second signals to form a composite time-delayed averaged signal; and switch means responsive to said control signals for selectively substituting the composite time-delayed averaged signal for the real-time signal.

2. A system for processing analog signals as set forth in claim 1 wherein the means for translating signal comprises:

a charge transfer device, a portion of which is arranged as a serial delay line having at least two tapping structures for supplying said first and second signals respectively advanced and delayed relative to the delay of one signal segment by a prescribed period; and ancillary support circuitry for operating the charge transfer device.

3. A system for processing analog signals as set forth in claim 1 wherein the means for translating signal comprises:

first and second analog delay lines, the first delay line connected for receiving real time signal and delaying said signal for a period of one complete signal segment less said prescribed period, said delayed signal corresponding to such first signal, the second delay line being connected for receiving said first signal from the first delay line, and delaying it an additional period equal to twice said prescribed period to produce said second signal; and means for applying said first and second signals available from the first and second delay lines to the means for combining the first and second delayed signals.

4. A signal error compensating circuit for a primary signal having temporally related segments of period $T_H$ and having an ancillary signal at a substantially constant frequency of period $T_{sc}$, or odd submultiple thereof said ancillary signal superimposed within the primary signal bandwidth, and wherein the phase of the ancillary signal is displaced by an odd multiple of 180° in alternate segments, said compensating circuit comprising:

a first terminal for receiving real-time signal susceptible of errors that are to be compensated;

a second terminal at which compensated signal is available to utilization means;

error detection means for detecting signal errors, which means is of a type responding to each detected error to supply a corresponding pulse of duration at least as long as the duration of the detected error;

signal delaying means for delaying the signal available at said first terminal, and from which first and second signals delayed by $T_H - T_{sc}/2$ and $T_H + T_{sc}/2$ are available;

signal summation means for summing signals in proportional response to the first and second delayed signals for providing a third delayed signal with ancillary signal shifted in phase by an odd multiple of 180°; and selector switch means responsive to each said control pulse for selectively applying the third delayed signal, to the second terminal and responsive to the absence of any control pulse supplied by said error correction means for applying real-time signal from said first terminal to said second terminal.

5. An improved system for playback of a record of successive images including pickup means for recovering a real-time video signal from the record, signal defect detection means and a source of video signal recovered from said record and delayed by one image line relative to said real-time signal; and means for substituting said delayed video signal for the real-time video signal upon detection of a defect in the real-time video signal, the improvement wherein said source of delayed video signals comprises:

means for delaying the real-time video signal by first and second intervals respectively shorter and longer than one image line;

means for averaging the signals delayed said first and second intervals for providing said video signal delayed by one image line.

* * * * *